US012340536B2

(12) United States Patent
Wagner et al.

(10) Patent No.: US 12,340,536 B2
(45) Date of Patent: Jun. 24, 2025

(54) SYSTEMS AND METHODS FOR MANAGING ASSETS (71) Applicant: Capital One Services, LLC, McLean, VA (US)

(72) Inventors: Jerry Wagner, Chesterfield, VA (US); Michael Mossoba, Great Falls, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 332 days.

(21) Appl. No.: 17/895,328

(22) Filed: Aug. 25, 2022

(65) Prior Publication Data
US 2024/0070899 A1 Feb. 29, 2024

(51) Int. Cl.
*G06V 10/00* (2022.01)
*G06Q 10/087* (2023.01)
*G06T 7/73* (2017.01)

(52) U.S. Cl.
CPC ............ *G06T 7/73* (2017.01); *G06Q 10/087* (2013.01); *G06T 2207/10032* (2013.01); *G06T 2207/30232* (2013.01)

(58) Field of Classification Search
None
See application file for complete search history.

(56) References Cited

U.S. PATENT DOCUMENTS

| 11,663,550 B1 * | 5/2023 | Marotta | G06Q 20/12 |
| | | | 705/26.8 |
| 2019/0087772 A1 * | 3/2019 | Medina | G05D 1/106 |
| 2019/0215424 A1 * | 7/2019 | Adato | G06T 7/521 |
| 2019/0236732 A1 * | 8/2019 | Speasl | G05D 1/101 |
| 2019/0339081 A1 * | 11/2019 | Malhotra | B64D 47/02 |
| 2020/0082168 A1 * | 3/2020 | Fathi | G06T 7/521 |

(Continued)

FOREIGN PATENT DOCUMENTS

| WO | WO-2018035482 A1 * | 2/2018 | |
| WO | WO-2022132025 A1 * | 6/2022 | |
| WO | WO-2022157268 A1 * | 7/2022 | ............. B64U 10/13 |

OTHER PUBLICATIONS

M. Beul, D. Droeschel, M. Nieuwenhuisen, J. Quenzel, S. Houben and S. Behnke, "Fast Autonomous Flight in Warehouses for Inventory Applications," in IEEE Robotics and Automation Letters, vol. 3, No. 4, pp. 3121-3128, Oct. 2018, doi: 10.1109/LRA.2018.2849833 (Year: 2018).*

(Continued)

*Primary Examiner* — Amir Alavi
(74) *Attorney, Agent, or Firm* — TROUTMAN PEPPER LOCKE LLP; Christopher J. Forstner; John A. Morrissett (57) ABSTRACT Disclosed embodiments may include a system for managing assets. The system may establish a connection with a drone comprising Light Detection and Ranging (LiDAR) sensors and an image capture device. The system may receive, via the drone, image data via the LiDAR sensors and the image capture device. The system may identify, from the image data via computer vision, one or more assets, a condition of the one or more assets, and a location associated with the one or more assets. The system may generate a dynamic report comprising the one or more assets, the condition of the one or more assets, and the location associated with the one or more assets.

20 Claims, 5 Drawing Sheets

(56) References Cited

U.S. PATENT DOCUMENTS

| | | | | |
|---|---|---|---|---|
| 2021/0053680 | A1* | 2/2021 | Prest | G08G 5/0069 |
| 2021/0289141 | A1* | 9/2021 | Qian | H04N 23/66 |
| 2021/0374659 | A1* | 12/2021 | Ganapathi | B65G 1/1371 |
| 2022/0011779 | A1* | 1/2022 | Kim | B64C 39/024 |
| 2022/0019970 | A1* | 1/2022 | Williams | G05D 1/0094 |
| 2022/0299995 | A1* | 9/2022 | Ganapathi | G05D 1/0094 |
| 2022/0398762 | A1* | 12/2022 | Marsh | G06T 11/00 |
| 2023/0161351 | A1* | 5/2023 | Prasad | G06Q 10/087 701/28 |
| 2023/0334586 | A1* | 10/2023 | Mariotti | G06V 10/70 |

OTHER PUBLICATIONS

Brinkhuis, M., den Hoedt, D., van der Meer, M., van Willegen, T., & Yarally, T. Optimising the Computer Vision Module of Eonics' Autonomous Drone. (2020) (Year: 2020).*

H. Duan, Y. Zhang and W. Sheng, "Image Digital Zoom Based Single Target Apriltag Recognition Algorithm in Large Scale Changes on the Distance," 2019 1st International Conference on Industrial Artificial Intelligence (IAI), Shenyang, China, 2019, pp. 1-6, doi: 10.1109/ICIAI.2019.8850822 (Year: 2019).*

I. Kalinov et al., "WareVision: CNN Barcode Detection-Based UAV Trajectory Optimization for Autonomous Warehouse Stocktaking," in IEEE Robotics and Automation Letters, vol. 5, No. 4, pp. 6647-6653, Oct. 2020, doi: 10.1109/LRA.2020.3010733 (Year: 2020).*

* cited by examiner

SYSTEMS AND METHODS FOR MANAGING ASSETS

The disclosed technology relates to systems and methods for managing assets. Specifically, this disclosed technology relates to managing assets using Light Detection and Ranging (LiDAR) technology.

BACKGROUND

There are many scenarios in which accurate inventory management is critical, such as for insurance settlements, internal business management, property maintenance, and the like. Inventory management typically involves regular review of the assets owned and/or controlled by a user or entity, such that the user or entity has an accurate picture of how its inventory changes over time.

Accordingly, there is a need for improved systems and methods for managing assets. Embodiments of the present disclosure are directed to this and other considerations.

SUMMARY

Disclosed embodiments may include a system for managing assets. The system may include one or more processors, and memory in communication with the one or more processors and storing instructions that, when executed by the one or more processors, are configured to cause the system to manage assets. The system may establish a connection with a drone comprising Light Detection and Ranging (LiDAR) sensors and an image capture device. The system may receive, via the drone, image data via the LiDAR sensors and the image capture device. The system may identify, from the image data via computer vision, one or more assets, a condition of the one or more assets, and a location associated with the one or more assets. The system may generate a dynamic report comprising the one or more assets, the condition of the one or more assets, and the location associated with the one or more assets.

Disclosed embodiments may include a system for managing assets. The system may include one or more processors, and memory in communication with the one or more processors and storing instructions that, when executed by the one or more processors, are configured to cause the system to manage assets. The system may establish a connection with a drone comprising LiDAR sensors and an image capture device. The system may receive, via the drone, image data via the LiDAR sensors and the image capture device. The system may identify, from the image data via computer vision, one or more assets and a location associated with the one or more assets. The system may generate a dynamic report comprising the one or more assets and the location associated with the one or more assets.

Disclosed embodiments may include a drone for managing assets. The drone may include one or more processors, and memory in communication with the one or more processors and storing instructions that, when executed by the one or more processors, are configured to cause the drone to manage assets. The drone may establish a connection with a server. The drone may detect, via LiDAR sensors and an image capture device, one or more objects in a predetermined space. The drone may determine, by a machine learning model (MLM), an optimal resolution associated with each of the one or more objects. The drone may transmit, to the server and via the LiDAR sensors and the image capture device, image data corresponding to the one or more objects and based on the optimal resolution.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Traditional systems and methods for managing assets typically include only a current snapshot of assets contained within a specific inventory, without accounting for how the conditions of those assets have or will change over time. As conditions of assets may greatly impact the value of those assets, such conditions should be considered in order to provide a more accurate picture of an asset inventory.

As such, examples of the present disclosure relate to systems and methods for managing assets. More particularly, the disclosed technology relates to tracking inventory assets by using LiDAR technology. For example, the disclosed technology relates to receiving image data from a LiDAR-based drone, identifying assets and their associated locations and conditions based on the image data, and generating a dynamic report including the assets and their associated locations and conditions.

Disclosed embodiments may employ machine learning models (MLMs), among other computerized techniques, to determine an optimal resolution associated with one or more objects in a predetermined space. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to determine an optimal resolution associated with one or more objects in a predetermined space such that a drone (or other device) may optically and/or physically zoom in on the object(s) as necessary to capture and transmit accurate associated image data associated with the object(s). This, in some examples, may involve using image input data and an MLM, applied to determine an optimal resolution associated with one or more objects in a predetermined space, to output accurate image data that can be used to identify assets and various features relating to such assets. Using an MLM and a computer system configured in this way may allow the system to conduct real-time asset tracking and to generate reports, maps, floorplans, etc., to display the identified assets and associated features.

This is a clear advantage and improvement over prior technologies that require multi-step processes for identifying, tracking, and organizing assets of, for example, an individual, a business, etc. The present disclosure solves this problem by relying on specific types of technology and modeling to identify and manage assets in real-time. Furthermore, examples of the present disclosure may also improve the speed with which computers can identify and manage assets. Overall, the systems and methods disclosed have significant practical applications in the asset management field because of the noteworthy improvements of the ability to quickly and accurately present asset inventory data, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
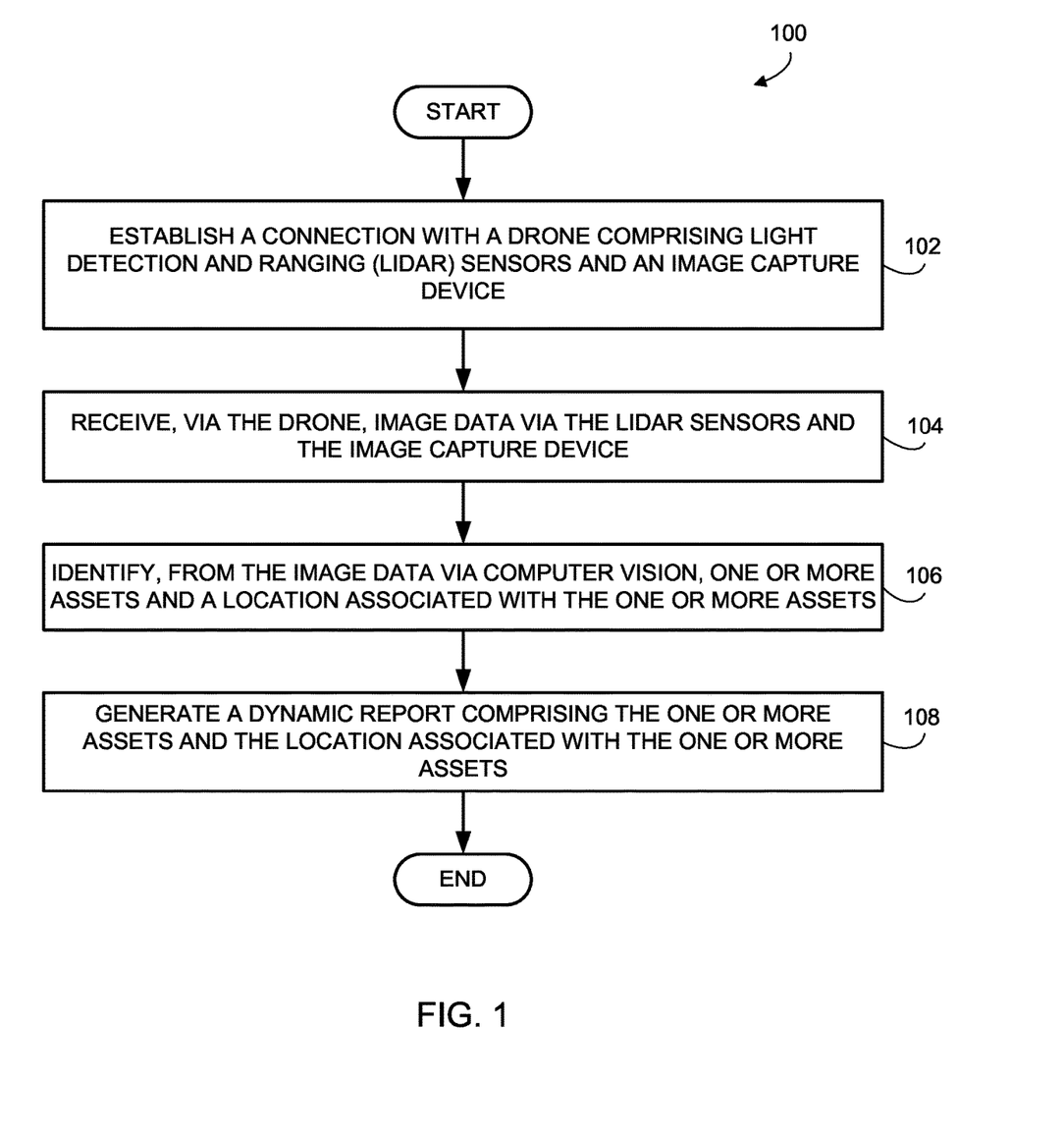
FIG. 1 is a flow diagram illustrating an exemplary method for managing assets in accordance with certain embodiments of the disclosed technology.

FIG. 1 is a flow diagram illustrating an exemplary method 100 for managing assets, in accordance with certain embodiments of the disclosed technology. The steps of method 100 may be performed by one or more components of the system 500 (e.g., asset detection system 300 or user device 502), as described in more detail with respect to FIGS. 3 and 5.

In block 102, the asset detection system 300 may establish a connection with a drone comprising LiDAR sensors and an image capture device. For example, asset detection system 300 may include a backend server configured to establish a connection with a drone via a network (e.g., network 504). The drone may include one or more LiDAR sensors and an image capture device, such as a camera, such that the drone may capture and transmit data back to the backend server, as further discussed below. In some embodiments, rather than a drone, the asset detection system 300 may establish a connection with a non-flying device or robot, such as a cleaning robot, as further discussed below. It should also be appreciated that the drone (or non-flying device or robot) may be configured with other types of technology that provide for similar data recognition and transmission as LiDAR technology (e.g., photogrammetry, Radio Detection and Ranging (RADAR), etc.).

In block 104, the asset detection system 300 may receive, via the drone, image data via the LiDAR sensors and the image capture device. For example, the drone may be configured to move around within a predetermined space to capture image data associated with one or more objects within the predetermined space, as further discussed below. The asset detection system 300 may receive the image data associated with the one or more objects such that the asset detection system 300 can use the image data to identify assets and features of those assets, as further discussed below.

In some embodiments, the asset detection system 300 may be configured to determine whether a predetermined amount of time has gone by since last receiving image data from the drone, and may transmit a notification to a user device (e.g., used device 502) depending on such determination. For example, if a period of 15 minutes has elapsed since receiving the last stream of image data, the asset detection system 300 may be configured to generate and transmit a notification to a user device (e.g., associated with a specific user) such that a user may attempt to retrieve the drone and/or restart the drone, for example, if the drone has shut down or gotten physically stuck somewhere in the predetermined space (e.g., under or behind a piece of furniture).

In block 106, the asset detection system 300 may identify, from the image data via computer vision, one or more assets, a condition of the one or more assets, and a location associated with the one or more assets. In some embodiments, asset detection system 300 may rely on one or more computer vision algorithms to identify the assets, conditions, and/or locations, as further discussed below. For example, a computer vision algorithm may be trained to recognize certain types or categories of objects (e.g., furniture, technology, etc.), or conditions of certain objects (e.g., whether an object appears new, slightly used, worn out, etc.). Asset detection system 300 may rely on multiple computer vision models, such as general and specific models. A specific model, for example, may be configured for specific use cases, such as identifying conditions of items in a rental property for maintenance and repair purposes, or identifying types and quantities of technology devices within an office space for purposes of providing each business employee with certain equipment.

In some embodiments, the asset detection system 300 may utilize one or more computer vision models to evaluate the image data corresponding to the one or more objects contained within the predetermined space (e.g., a computer, a television, a couch, a desk, etc.), and to determine which of those objects correspond to assets in need of inventorying. The asset detection system 300 may determine that all identified objects are assets, or that a certain number of the objects are assets. Whether some or all objects identified are determined as assets may depend on the type of scenario for which the system is utilized. For example, if a business is interested in inventorying only its technology assets (e.g., computers, scanners, printers, etc.), the asset detection system 300 may be configured to only identify those predetermined types of objects as assets. As another example, if a landlord of a rental property is interested in evaluating which structural assets may need repair (e.g., doors, windows, floor tiles, etc.), the asset detection system 300 may be configured to only identify those predetermined types of objects as assets.

In some embodiments, the asset detection system 300 may utilize one or more computer vision models to identify the condition of the one or more assets. For example, the asset detection system 300 may be configured to recognize differences in certain assets to determine, for example, if an asset appears broken, worn out, to have certain markings on it (e.g., dents, scratches, etc.), and the like. The asset detection system 300 may then be configured to extrapolate or estimate a remaining lifespan or an age of certain assets, for example, to provide an estimate of when certain assets should be replaced or repaired.

In some embodiments, the asset detection system 300 may utilize one or more computer vision models to identify the location of the one or more assets. For example, the asset detection system 300 may be configured to evaluate the received image data to determine where each identified asset is within a predetermined space, such as an office, a rental property, etc., such that the asset detection system 300 may provide this information to an appropriate user (e.g., an office manager, landlord, etc.), as further discussed below. The asset detection system 300 may also be configured to evaluate the received image data to determine one or more dimensions of the identified assets and/or their locations within the predetermined space.

In block 108, the asset detection system 300 may generate a dynamic report comprising the one or more assets, the condition of the one or more assets, and the location associated with the one or more assets. For example, the dynamic report may be a spreadsheet or other type of listing of the assets and their respective estimated conditions and locations. The spreadsheet or listing may be configured to enable a user to query or filter the data to provide for various types of analyses. In some embodiments, the dynamic report may comprise a floorplan of the predetermined space in which the drone identified the one or more objects (e.g., an office space). In such embodiments, the asset detection system 300 may be configured to generate a floorplan of the space, along with image and/or text data associated with the assets and respective feature information (e.g., conditions, ages, lifespans, etc.) placed in or near each respective location of each identified asset. In some embodiments, the dynamic report may comprise a three-dimensional map of the predetermined space, along with image and/or text data associated with the assets and their respective feature information in or near each respective location. In some embodiments, the dynamic report may comprise a heat map corresponding to an optimal resolution associated with each of the one or more assets, as further discussed below.

Figure 2:
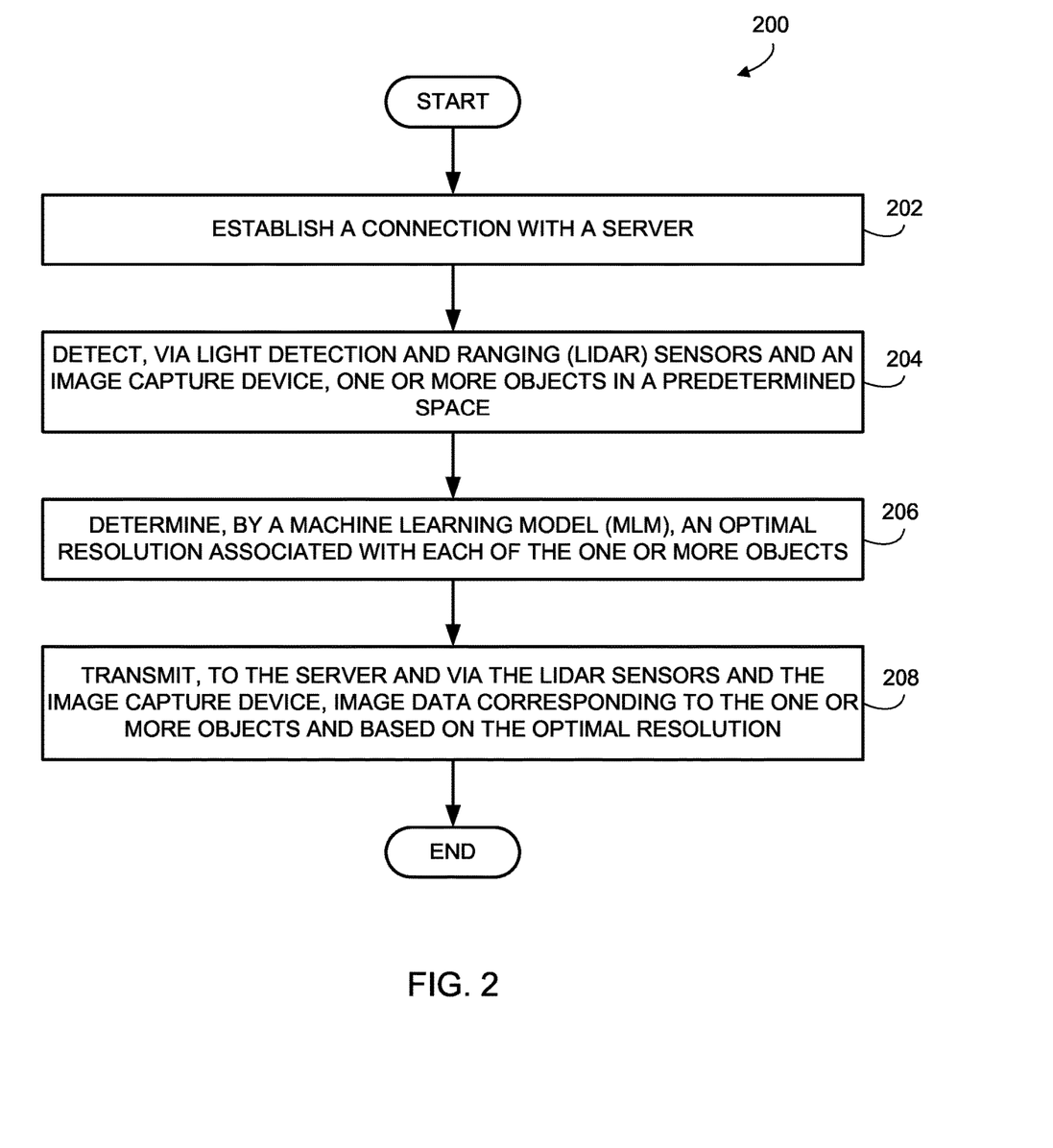
FIG. 2 is a flow diagram illustrating an exemplary method for managing assets in accordance with certain embodiments of the disclosed technology.

FIG. 2 is a flow diagram illustrating an exemplary method 200 for managing assets, in accordance with certain embodiments of the disclosed technology. The steps of method 200 may be performed by one or more components of the system 500 (e.g., drone 400), as described in more detail with respect to FIG. 4.

In block 202, the drone 400 may establish a connection with a server. For example, drone 400 may establish a connection with asset detection system 300 via a network (e.g., network 504). As discussed above, in some embodiments, rather than a drone, a non-flying device or robot may be utilized.

In block 204, the drone 400 may detect, via LiDAR sensors and an image capture device, one or more objects in a predetermined space. For example, the drone may be configured to autonomously move throughout a predetermined space (e.g., a business office) and capture image data associated with one or more objects (e.g., computers, printers, scanners, desks, chairs, etc.). In some embodiments, the drone may be configured to perform extrapolation such that it can detect overlapping objects, such as a desk sitting on a rug, to provide accurate image data back to the server.

In some embodiments, the drone 400 may be configured to interact with specific objects within the predetermined space. For example, the drone 400 may be configured to scan a barcode affixed to an object, run into a switch or button (e.g., to flip or click such switch or button) to open or close an object in the predetermined space (e.g., a closet, cabinet, door, etc.), and the like. In some embodiments, the drone 400 may be configured to interact with specific objects such that a user on the backend may later evaluate the captured image data for a specific purpose. For example, a user may be interested in evaluating how hard or soft certain buttons, switches, etc., would need to be pushed, pulled, clicked, etc., such that a handicapped user can access certain objects and/or areas within the predetermined space. In such embodiments, the drone 400 may be configured to interact with such types of objects within the predetermined space, and provide data associated with such interactions back to the server.

In some embodiments, the drone 400 may be configured, for example via an MLM, to determine whether it has captured image data associated with all necessary objects within a predetermined space. In some embodiments, the drone 400 may be configured to determine whether a certain area within the predetermined space is inaccessible. For example, the drone 400 may identify and capture image data associated with a closed and/or locked door, and may transmit data back to the server to indicate that a certain area was inaccessible to the drone 400.

In some embodiments where a non-flying device or robot is used in place of drone 400, as discussed above, the non-flying device may be configured to identify one or more objects on the floor or ground of the predetermined space. For example, a cleaning or maintenance robot may be used to identify one or more objects that may need cleaning or replacing. In such embodiments, the non-flying device may be configured to transmit image data back to the server such that the server (e.g., asset detection system 300) may identify, e.g., a condition of such objects for evaluating cleaning, maintenance, and/or repair requirements for various assets.

In block 206, the drone 400 may determine, by an MLM, an optimal resolution associated with each of the one or more objects. For example, the drone 400 may be configured to determine that certain objects may require an increased resolution in order to provide accurate image data back to the server. In some embodiments, the MLM may be trained to determine a level of importance of each identified object within the predetermined space. The MLM may be trained, for example, with historical data corresponding to various types of objects and their respective levels of importance based on, for example, user feedback and/or a type of inventory analysis required (e.g., maintenance in a rental property, asset management of a business, etc.). For example, the MLM may be trained such that if the drone 400 comes across a type of marking on a specific object, such as a barcode or other type of product label, the drone 400 may be configured to physically and/or optically zoom in on that marking such that it can capture image data of the marking at a higher resolution and provide higher quality image data back to the server.

In some embodiments, providing higher quality image data back to the server may allow the server (e.g., asset detection system 300) to generate a dynamic report comprising a heat map, as discussed above, where the heat map displays the various optimal resolutions corresponding to each identified asset. Such type of report may enable an end user, such as a business manager, to efficiently evaluate the assets of highest and/or lowest importance in terms of evaluating the business's inventory.

In block 208, the drone 400 may transmit, to the server and via the LiDAR sensors and the image capture device, image data corresponding to the one or more objects and based on the optimal resolution. For example, the drone 400 may be configured to transmit the captured image data, based on the determined optimal resolution for each of the objects, back to the server such that the server may evaluate the image data for assets and various features associated with such assets, as discussed above.

Figure 3:
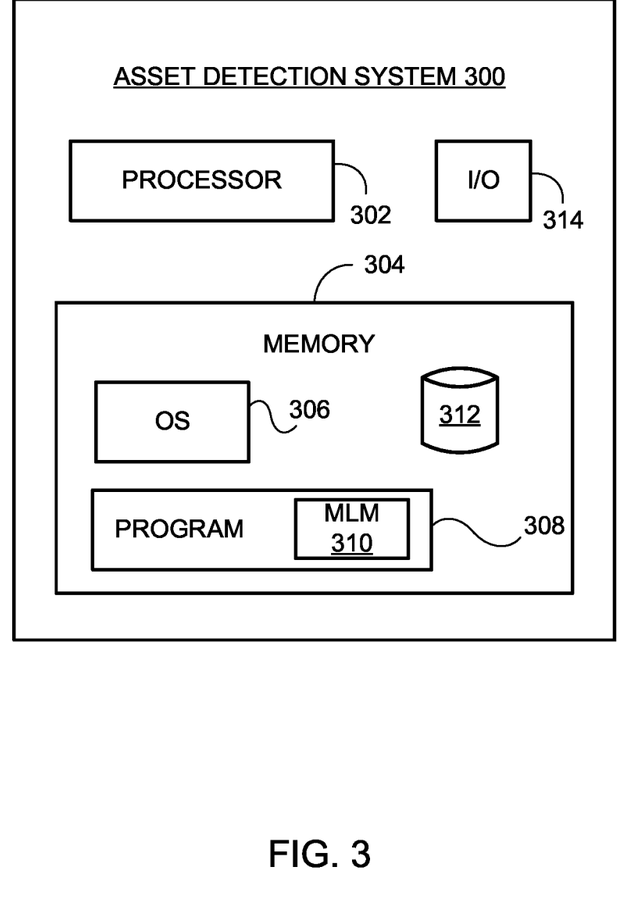
FIG. 3 is block diagram of an example asset detection system used to manage assets, according to an example implementation of the disclosed technology.
Figure 4:
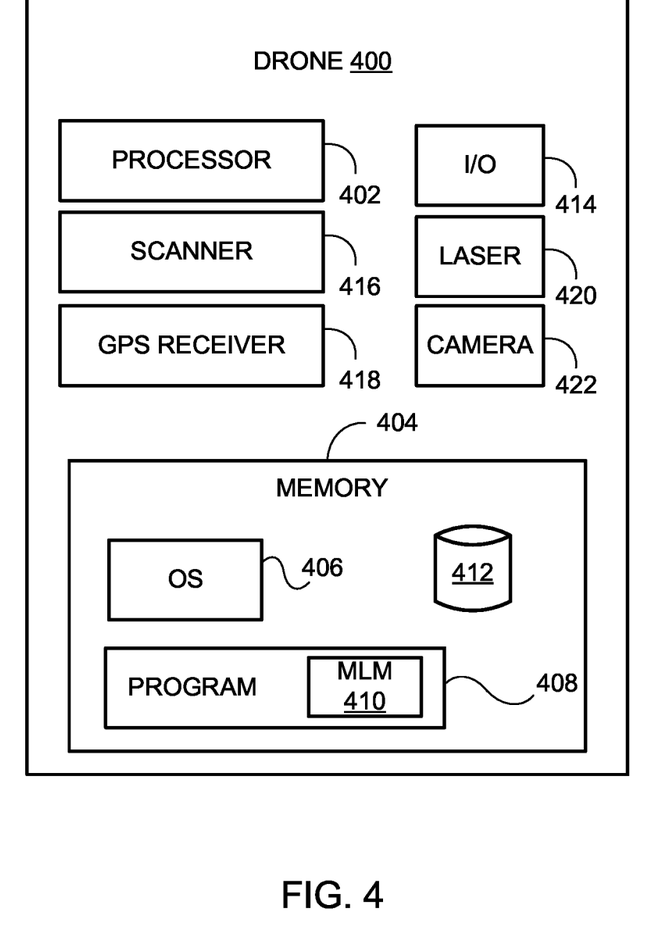
FIG. 4 is a block diagram of an example drone used to manage assets, according to an example implementation of the disclosed technology.
Figure 5:
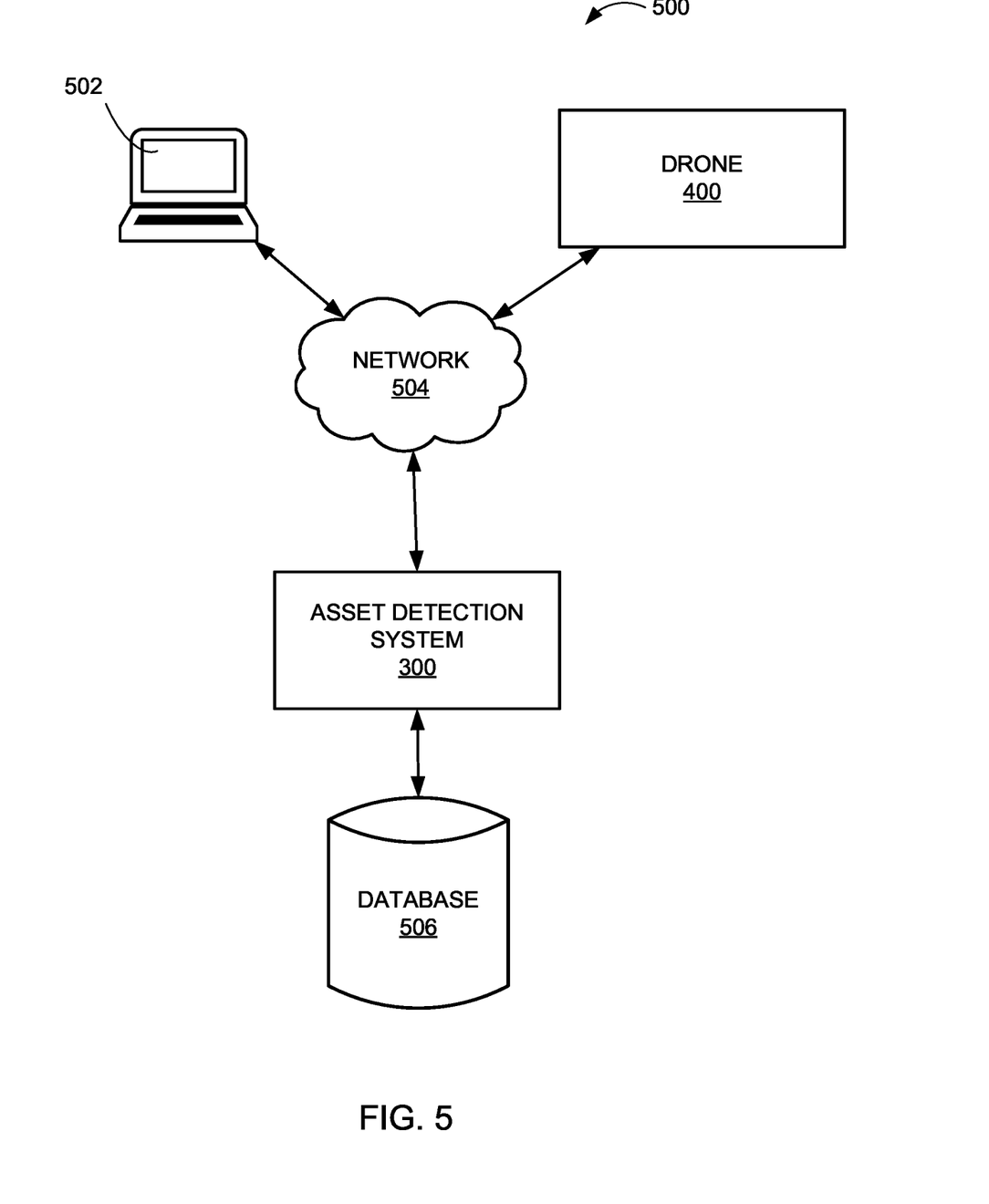
FIG. 5 is block diagram of an example system that may be used to manage assets, according to an example implementation of the disclosed technology.

FIG. 3 is a block diagram of an example asset detection system 300 used to manage assets according to an example implementation of the disclosed technology. According to some embodiments, the user device 502 and drone 400, as depicted in FIGS. 4 and 5 and described below, may have the same or similar structure, components, and/or functionalities as those described with respect to asset detection system 300 shown in FIG. 3. As shown, the asset detection system 300 may include a processor 302, an input/output (I/O) device 314, a memory 304 containing an operating system (OS) 306 and a program 308. In some embodiments, program 308 may include an MLM 310 that may be trained, for example, to determine or predict various features associated with identified assets. In certain implementations, MLM 310 may issue commands in response to processing an event, in accordance with a model that may be continuously or intermittently updated. Moreover, processor 302 may execute one or more programs (such as via a rules-based platform or the trained MLM 310), that, when executed, perform functions related to disclosed embodiments.

In certain example implementations, the asset detection system 300 may be a single server or may be configured as a distributed computer system including multiple servers or computers that interoperate to perform one or more of the processes and functionalities associated with the disclosed embodiments. In some embodiments asset detection system 300 may be one or more servers from a serverless or scaling server system. In some embodiments, the asset detection system 300 may further include a peripheral interface, a transceiver, a mobile network interface in communication with the processor 302, a bus configured to facilitate communication between the various components of the asset detection system 300, and a power source configured to power one or more components of the asset detection system 300.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 302 to communicate with other devices via wired or wireless networks, whether local or wide area, private or public, as known in the art. A power source may be configured to provide an appropriate alternating current (AC) or direct current (DC) to power components.

The processor 302 may include one or more of a microprocessor, microcontroller, digital signal processor, co-processor or the like or combinations thereof capable of executing stored instructions and operating upon stored data. The memory 304 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 304.

The processor 302 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 302 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 302 may be a single core processor that is configured with virtual processing technologies. In certain embodiments, the processor 302 may use logical processors to simultaneously execute and control multiple processes. The processor 302 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the asset detection system 300 may include one or more storage devices configured to store information used by the processor 302 (or other components) to perform certain functions related to the disclosed embodiments. In one example, the asset detection system 300 may include the memory 304 that includes instructions to enable the processor 302 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The asset detection system 300 may include a memory 304 that includes instructions that, when executed by the processor 302, perform one or more processes consistent with the functionalities disclosed herein. Methods, systems, and articles of manufacture consistent with disclosed embodiments are not limited to separate programs or computers configured to perform dedicated tasks. For example, the asset detection system 300 may include the memory 304 that may include one or more programs 308 to perform one or more functions of the disclosed embodiments. For example, in some embodiments, the asset detection system 300 may additionally manage dialogue and/or other interactions with the customer via a program 308.

The processor 302 may execute one or more programs 308 located remotely from the asset detection system 300. For example, the asset detection system 300 may access one or more remote programs that, when executed, perform functions related to disclosed embodiments.

The memory 304 may include one or more memory devices that store data and instructions used to perform one or more features of the disclosed embodiments. The memory 304 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 304 may include software components that, when executed by the processor 302, perform one or more processes consistent with the disclosed embodiments. In some embodiments, the memory 304 may include an asset detection system database 312 for storing related data to enable the asset detection system 300 to perform one or more of the processes and functionalities associated with the disclosed embodiments.

The asset detection system database 312 may include stored data relating to status data (e.g., average session duration data, location data, idle time between sessions, and/or average idle time between sessions) and historical status data. According to some embodiments, the functions provided by the asset detection system database 312 may also be provided by a database that is external to the asset detection system 300, such as the database 506 as shown in FIG. 5.

The asset detection system 300 may also be communicatively connected to one or more memory devices (e.g., databases) locally or through a network. The remote memory devices may be configured to store information and may be accessed and/or managed by the asset detection system 300. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The asset detection system 300 may also include one or more I/O devices 314 that may comprise one or more interfaces for receiving signals or input from devices and providing signals or output to one or more devices that allow data to be received and/or transmitted by the asset detection system 300. For example, the asset detection system 300 may include interface components, which may provide interfaces to one or more input devices, such as one or more keyboards, mouse devices, touch screens, track pads, trackballs, scroll wheels, digital cameras, microphones, sensors, and the like, that enable the asset detection system 300 to receive data from a user (such as, for example, via the user device 502).

In examples of the disclosed technology, the asset detection system 300 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The asset detection system 300 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The asset detection system 300 may be configured to adjust model parameters during training. Model parameters may include weights, coefficients, offsets, or the like. Training may be supervised or unsupervised.

The asset detection system 300 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hillclimb, a neighborhood search, an adaptive random search, or the like. The asset detection system 300 may be configured to optimize statistical models using known optimization techniques.

Furthermore, the asset detection system 300 may include programs configured to retrieve, store, and/or analyze properties of data models and datasets. For example, asset detection system 300 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The asset detection system 300 may include algorithms to determine a data type, key-value pairs, row-column data structure, statistical distributions of information such as keys or values, or other property of a data schema may be configured to return a statistical profile of a dataset (e.g., using a data-profiling model). The asset detection system 300 may be configured to implement univariate and multivariate statistical methods. The asset detection system 300 may include a regression model, a Bayesian model, a statistical model, a linear discriminant analysis model, or other classification model configured to determine one or more descriptive metrics of a dataset. For example, asset detection system 300 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The asset detection system 300 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, asset detection system 300 may be configured to generate a similarity metric representing a measure of similarity between data in a dataset. A similarity metric may be based on a correlation, covariance matrix, a variance, a frequency of overlapping values, or other measure of statistical similarity.

The asset detection system 300 may be configured to generate a similarity metric based on data model output, including data model output representing a property of the data model. For example, asset detection system 300 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The asset detection system 300 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The asset detection system 300 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, asset detection system 300 is configured to generate and/or train a classification model to classify a dataset, consistent with disclosed embodiments.

The asset detection system 300 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the asset detection system may analyze information applying machine-learning methods.

While the asset detection system 300 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the asset detection system 300 may include a greater or lesser number of components than those illustrated.

FIG. 4 is a block diagram of an example drone 400 used to manage assets according to an example implementation of the disclosed technology. As discussed above, the drone 400 may have the same or similar structure, components, and/or functionalities as the asset detection system 300 described above with respect to FIG. 3. As shown, the drone 400 may include a processor 402, an I/O device 414, and a memory 404 containing an OS 406, a program 408, and a database 412. In some embodiments, program 408 may include an MLM 410 that may be trained, for example, to determine an optimal resolution associated with each of one or more objects within a predetermined space. In certain implementations, MLM 410 may issue commands in response to processing an event, in accordance with a model that may be continuously or intermittently updated. Moreover, processor

402 may execute one or more programs (such as via a rules-based platform or the trained MLM 410), that, when executed, perform functions related to disclosed embodiments.

Drone 400 may also include a scanner 416, a Global Positioning System (GPS) receiver 418, a laser 420, an image capture device 422 (e.g., a camera), and any other sensor devices necessary for configuration of LiDAR, or another similar, technology.

FIG. 5 is a block diagram of an example system that may be used to manage assets according to an example implementation of the disclosed technology. The components and arrangements shown in FIG. 5 are not intended to limit the disclosed embodiments as the components used to implement the disclosed processes and features may vary. As shown, asset detection system 300 may interact with a user device 502 and/or a drone 400 via a network 504. In certain example implementations, the asset detection system may include a database 506.

In some embodiments, a user may operate the user device 502. The user device 502 can include one or more of a mobile device, smart phone, general purpose computer, tablet computer, laptop computer, telephone, public switched telephone network (PSTN) landline, smart wearable device, voice command device, other mobile computing device, or any other device capable of communicating with the drone 400 and/or the asset detection system 300 via network 504. In some embodiments, the user device 502 may include or incorporate electronic communication devices for hearing or vision impaired users.

According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The asset detection system 300 may include programs (scripts, functions, algorithms) to configure data for visualizations and provide visualizations of datasets and data models on the user device 502. This may include programs to generate graphs and display graphs. The asset detection system 300 may include programs to generate histograms, scatter plots, time series, or the like on the user device 502. The asset detection system 300 may also be configured to display properties of data models and data model training results including, for example, architecture, loss functions, cross entropy, activation function values, embedding layer structure and/or outputs, convolution results, node outputs, or the like on the user device 502.

The network 504 may be of any suitable type, including individual connections via the internet such as cellular or WiFi networks. In some embodiments, the network 504 may connect terminals, services, and mobile devices using direct connections such as RFID, NFC, Bluetooth™ BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 504 may include any type of computer networking arrangement used to exchange data. For example, the network 504 may be the Internet, a private data network, virtual private network (VPN) using a public network, and/or other suitable connection(s) that enable(s) components in the system 500 environment to send and receive information between the components of the system 500. The network 504 may also include a PSTN and/or a wireless network.

System 500 (or one or more components of system 500) may be associated with and optionally controlled by one or more entities such as a business, corporation, individual, partnership, and/or any other entity that provides one or more of goods, services, and consultations to individuals such as customers. In some embodiments, system 500 may be controlled by a third party on behalf of another business, corporation, individual, and/or partnership. The system 500 may include one or more servers and computer systems for performing one or more functions associated with products and/or services that the organization provides.

Asset detection system 300 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 502 and/or drone 400 may be able to access asset detection system 300 using the cloud computing environment. User device 502 and/or drone 400 may be able to access asset detection system 300 using specialized software. The cloud computing environment may eliminate the need to install specialized software on user device 502 and/or drone 400.

In accordance with certain example implementations of the disclosed technology, the asset detection system 300 may correlate compiled data, analyze the compiled data, arrange the compiled data, generate derived data based on the compiled data, and store the compiled and derived data in a database such as the database 506. According to some embodiments, the database 506 may be a database associated with an organization and/or a related entity that stores a variety of information relating to customers, transactions, ATM, and business operations. The database 506 may also serve as a back-up storage device and may contain data and information that is also stored on, for example, database 312, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, a backend server may establish a connection with a drone. The drone may be configured with LiDAR sensors and an image capture device, and may be configured to autonomously navigate around a predetermined space, such as a business office. Using at least its LiDAR sensors and image capture device, the drone may detect one or more objects within the office, such as desks, chairs, computers, laptops, printers, scanners, and the like. The drone may be configured to determine an optimal resolution for capturing image data associated with each item. For example, the drone may be configured to zoom in on a barcode affixed to the side of a scanner such that the drone can capture image data associated with the barcode. The drone may transmit the captured image data, either as a real-time data stream or in batches, back to the backend server. The backend server may use one or more computer vision models and/or algorithms to evaluate the image data and extract certain features or information pertaining to the different objects captured by the drone. For example, the backend server may identify all of the technology device assets and/or furniture assets within the predetermined space, and include such assets for display in a dynamic report. The backend server may also determine an estimated condition of each identified asset, and based on the condition, an approximate lifespan remaining for each asset. The backend server may also include the condition and lifespan information within the dynamic report.

Once the backend server generates the full dynamic report, an end user (e.g., an office manager) can use the report for inventory management. For example, the office manager can filter the data within the report based on lifespan to determine the office assets that may require replacing the soonest. With that information, the office manager may be able to efficiently manage all of the office's assets and conduct, for example, budget planning to ensure a proper replacement schedule for outdated equipment or furniture.

In some examples, disclosed systems or methods may involve one or more of the following clauses:

Clause 1: A system, comprising: one or more processors; and a memory in communication with the one or more processors and storing instructions that, when executed by the one or more processors, are configured to cause the system to: establish a connection with a drone comprising Light Detection and Ranging (LiDAR) sensors and an image capture device; receive, via the drone, image data via the LiDAR sensors and the image capture device; identify, from the image data via computer vision, one or more assets, a condition of the one or more assets, and a location associated with the one or more assets; and generate a dynamic report comprising the one or more assets, the condition of the one or more assets, and the location associated with the one or more assets.

Clause 2: The system of clause 1, wherein the instructions are further configured to cause the system to: identify, from the image data via computer vision, a lifespan of the one or more assets, an age of the one or more assets, or both.

Clause 3: The system of clause 1, wherein the dynamic report further comprises a floorplan of the location associated with the one or more assets in a predetermined space, a three-dimensional map of the predetermined space, a heat map corresponding to an optimal resolution associated with each of the one or more assets, or combinations thereof.

Clause 4: The system of clause 1, wherein the instructions are further configured to cause the system to: determine whether the image data has not been received for a predetermined amount of time; and responsive to determining the image data has not been received for a predetermined amount of time, transmit a notification to a computing device.

Clause 5: The system of clause 1, wherein the drone is configured to determine, by a machine learning model (MLM), an optimal resolution associated with one or more objects in a predetermined space.

Clause 6: The system of clause 5, wherein the drone is configured to optically and/or physically zoom in on the one or more objects based on determining the optimal resolution.

Clause 7: The system of clause 6, wherein the image data is based on the optimal resolution.

Clause 8: A system, comprising: one or more processors; and a memory in communication with the one or more processors and storing instructions that, when executed by the one or more processors, are configured to cause the system to: establish a connection with a drone comprising Light Detection and Ranging (LiDAR) sensors and an image capture device; receive, via the drone, image data via the LiDAR sensors and the image capture device; identify, from the image data via computer vision, one or more assets and a location associated with the one or more assets; and generate a dynamic report comprising the one or more assets and the location associated with the one or more assets.

Clause 9: The system of clause 8, wherein the instructions are further configured to cause the system to: identify, from the image data via computer vision, a lifespan of the one or more assets, an age of the one or more assets, a condition of the one or more assets, or combinations thereof.

Clause 10: The system of clause 8, wherein the dynamic report further comprises a floorplan of the location associated with the one or more assets in a predetermined space, a three-dimensional map of the predetermined space, or both.

Clause 11: The system of clause 8, wherein the instructions are further configured to cause the system to: determine whether the image data has not been received for a predetermined amount of time; and responsive to determining the image data has not been received for a predetermined amount of time, transmit a notification to a computing device.

Clause 12: The system of clause 8, wherein the drone is configured to determine, by a machine learning model (MLM), an optimal resolution associated with one or more objects in a predetermined space.

Clause 13: The system of clause 12, wherein the drone is configured to optically and/or physically zoom in on the one or more objects based on determining the optimal resolution.

Clause 14: The system of clause 12, wherein the image data is based on the optimal resolution.

Clause 15: The system of clause 14, wherein the dynamic report further comprises a heat map corresponding to the optimal resolution.

Clause 16: A drone, comprising: one or more processors; and a memory in communication with the one or more processors and storing instructions that, when executed by the one or more processors, are configured to cause the drone to: establish a connection with a server; detect, via Light Detection and Ranging (LiDAR) sensors and an image capture device, one or more objects in a predetermined space; determine, by a machine learning model (MLM), an optimal resolution associated with each of the one or more objects; and transmit, to the server and via the LiDAR sensors and the image capture device, image data corresponding to the one or more objects and based on the optimal resolution.

Clause 17: The drone of clause 16, wherein the instructions are further configured to cause the drone to: interact with at least one object of the one or more objects in the predetermined space.

Clause 18: The drone of clause 17, wherein the at least one object comprises an electronic lock, a button, a switch, a barcode, or combinations thereof.

Clause 19: The drone of clause 16, wherein the instructions are further configured to cause the drone to: responsive to determining the optimal resolution, optically and/or physically zoom in on the one or more objects in the predetermined space.

Clause 20: The drone of clause 16, wherein the instructions are further configured to cause the drone to: determine whether at least one object of the one or more objects in the predetermined space is inaccessible; and responsive to determining the at least one object is inaccessible, transmit a notification to the server.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
one or more processors; and
a memory in communication with the one or more processors and storing instructions that, when executed by the one or more processors, are configured to cause the system to:
establish a connection with a drone comprising Light Detection and Ranging (LiDAR) sensors and an image capture device;
receive, via the drone, image data via the LiDAR sensors and the image capture device, wherein the image data is based on an optimal resolution;
identify, from the image data via computer vision, one or more assets, a condition of the one or more assets, and a location associated with the one or more assets; and generate a dynamic report comprising the one or more assets, the condition of the one or more assets, and the location associated with the one or more assets, the dynamic report further comprising a heat map corresponding to the optimal resolution.

2. The system of claim 1, wherein the instructions are further configured to cause the system to:
identify, from the image data via computer vision, a lifespan of the one or more assets, an age of the one or more assets, or both.

3. The system of claim 1, wherein the dynamic report further comprises a floorplan of the location associated with the one or more assets in a predetermined space, a three-dimensional map of the predetermined space, or combinations thereof.

4. The system of claim 1, wherein the instructions are further configured to cause the system to:
determine whether the image data has not been received for a predetermined amount of time; and
responsive to determining the image data has not been received for a predetermined amount of time, transmit a notification to a computing device.

5. The system of claim 1, wherein the drone is configured to determine, by a machine learning model (MLM), the optimal resolution associated with one or more objects in a predetermined space.

6. The system of claim 5, wherein the drone is configured to optically and/or physically zoom in on the one or more objects based on determining the optimal resolution.

7. The system of claim 1, wherein the instructions are further configured to cause the system to:
receive, via the drone, interaction data derived from at least one physical interaction between the drone and at least one object of one or more objects in a predetermined space.

8. The system of claim 7, wherein the at least one object comprises an electronic lock, a button, a switch, or combinations thereof.

9. The system of claim 7, wherein at least one physical interaction comprises the drone opening or closing the at least one object of the one or more objects in the predetermined space.

10. The system of claim 7, wherein the interaction data comprises an indication of an amount of force needed to successfully manipulate the at least one object.

11. A system, comprising:
one or more processors; and
a memory in communication with the one or more processors and storing instructions that, when executed by the one or more processors, are configured to cause the system to:
establish a connection with a drone comprising Light Detection and Ranging (LiDAR) sensors and an image capture device;
receive, via the drone, image data via the LiDAR sensors and the image capture device, wherein the image data is based on an optimal resolution;
identify, from the image data via computer vision, one or more assets and a location associated with the one or more assets; and
generate a dynamic report comprising the one or more assets and the location associated with the one or more assets, the dynamic report further comprising a heat map corresponding to the optimal resolution.

12. The system of claim 11, wherein the instructions are further configured to cause the system to:
identify, from the image data via computer vision, a lifespan of the one or more assets, an age of the one or more assets, a condition of the one or more assets, or combinations thereof.

13. The system of claim 11, wherein the dynamic report further comprises a floorplan of the location associated with the one or more assets in a predetermined space, a three-dimensional map of the predetermined space, or both.

14. The system of claim 11, wherein the instructions are further configured to cause the system to:
determine whether the image data has not been received for a predetermined amount of time; and
responsive to determining the image data has not been received for a predetermined amount of time, transmit a notification to a computing device.

15. The system of claim 11, wherein the drone is configured to determine, by a machine learning model (MLM), an optimal resolution associated with one or more objects in a predetermined space.

16. The system of claim 15, wherein the drone is configured to optically and/or physically zoom in on the one or more objects based on determining the optimal resolution.

17. A drone, comprising:
one or more processors; and
a memory in communication with the one or more processors and storing instructions that, when executed by the one or more processors, are configured to cause the drone to:
establish a connection with a server;
detect, via Light Detection and Ranging (LiDAR) sensors and an image capture device, one or more objects in a predetermined space;
determine, by a machine learning model (MLM), an optimal resolution associated with each of the one or more objects;
obtain interaction data by physically interacting with at least one object of the one or more objects in the predetermined space; and
transmit, to the server and via the LiDAR sensors and the image capture device, image data corresponding to the one or more objects and based on the optimal resolution and the interaction data.

18. The drone of claim 17, wherein the at least one object comprises an electronic lock, a button, a switch, or combinations thereof.

19. The drone of claim 17, wherein the instructions are further configured to cause the drone to:
responsive to determining the optimal resolution, optically and/or physically zoom in on the one or more objects in the predetermined space.

20. The drone of claim 17, wherein the instructions are further configured to cause the drone to:
determine whether at least one object of the one or more objects in the predetermined space is inaccessible; and
responsive to determining the at least one object is inaccessible, transmit a notification to the server.

* * * * *